(12) United States Patent
Chang

(10) Patent No.: US 7,294,090 B2
(45) Date of Patent: Nov. 13, 2007

(54) PLANETARY GEAR DEVICE FOR REDUCTION GEARING

(75) Inventor: Robin C. S. Chang, Taichung Industrial Zone (TW)

(73) Assignee: Apex Dynamics, Inc., Taichung (TW)

( * ) Notice: Subject to any disclaimer, the term of this patent is extended or adjusted under 35 U.S.C. 154(b) by 177 days.

(21) Appl. No.: 11/243,666

(22) Filed: Oct. 4, 2005

(65) Prior Publication Data

US 2007/0078037 A1    Apr. 5, 2007

(51) Int. Cl.
*F16H 57/04*    (2006.01)
*F16H 57/08*    (2006.01)

(52) U.S. Cl. ...................... 475/348; 475/159
(58) Field of Classification Search ............... 475/348, 475/337, 159
See application file for complete search history.

(56) References Cited

U.S. PATENT DOCUMENTS

| | | | | |
|---|---|---|---|---|
| 6,129,648 A * | 10/2000 | Tanioka et al. | ............. | 475/331 |
| 6,432,022 B1 * | 8/2002 | Bayer | ............. | 475/331 |
| 6,503,168 B2 * | 1/2003 | Chang | ............. | 475/348 |
| 6,824,495 B1 * | 11/2004 | Kirschner | ............. | 475/348 |
| 6,869,381 B2 * | 3/2005 | Chang | ............. | 475/346 |
| 7,182,709 B2 * | 2/2007 | Christ et al. | ............. | 475/348 |

* cited by examiner

*Primary Examiner*—Dirk Wright
(74) *Attorney, Agent, or Firm*—Charles E. Baxley

(57) ABSTRACT

A planetary gear device includes a housing having a chamber for receiving lubricating member and having an internal gear, a carrier rotatably received in the chamber of the housing and having an output shaft and having a number of openings for rotatably receiving planet pinions. The planet pinions are engaged with the internal gear of the housing, and each includes a bore for receiving an axle, and a number of rollers received between the planet pinion and the axle to act as a bearing device for smoothly attaching the planet pinions on the axles. The planet pinions each has one or two side portions each having one or more slots for filling the lubricating member into the bore of the planet pinion.

5 Claims, 5 Drawing Sheets

PLANETARY GEAR DEVICE FOR REDUCTION GEARING

BACKGROUND OF THE INVENTION

1. Field of the Invention

The present invention relates to a planetary gear device for a reduction gearing, and more particularly to a planetary gear device having an oil supplying or filling structure for suitably feeding or supplying or filling lubricating oil to lubricate the gears and the pinions of the planetary gear device, and for decreasing frictions and vibrations and noises that may be generated between the gears and the pinions, and thus for increasing the working life of the gears and the pinions of the planetary gear device.

2. Description of the Prior Art

Typical planetary gear devices have been developed and provided for coupling to a spindle or an output shaft of a motor, and for acting as a reduction gearing, in order to generate or to provide a reduced output rotational speed. Normally, the typical planetary gear devices comprise a number of planet wheel members rotatably attached to a planet carrier, and engaged with a sun wheel member, and engaged with an internal gear formed or provided within an outer housing, and arranged to allow the planet wheel members to be rotated or driven by the sun wheel member, in order to provide the reduced output rotational speed.

For example, the applicant has developed and filed one of the planetary gear devices, and issued as U.S. Pat. No. 6,503,168 to Chang, which also comprises a sun wheel member coupled to a motor, and engaged with a number of planet wheel members that are rotatably attached to a planet carrier, and that are engaged with an internal gear formed or provided within an outer housing, so as to reduce speed of the spindle or output shaft of the motor.

Normally, the sun wheel member and the planet wheel members are rotated fast or in a great speed relative to the planet carrier and the outer housing, such that lubrication grease or oil should be suitably filled or feeding into the outer housing and the planet carrier, to allow the sun wheel member and the planet wheel members to be suitably lubricated.

However, the planet wheel members are directly and rotatably attached onto the planet carrier with shafts, and have no bearing devices engaged or provided between the planet wheel members and the shafts, such that an increased friction may be generated between the planet wheel members and the shafts, and such that an increased noise and vibration may be generated between the planet wheel members and the shafts after use.

The present invention has arisen to mitigate and/or obviate the afore-described disadvantages of the conventional planetary gear devices.

SUMMARY OF THE INVENTION

The primary objective of the present invention is to provide a planetary gear device including an oil supplying or filling structure for suitably feeding or supplying or filling lubricating oil to lubricate the gears and the pinions of the planetary gear device, and for decreasing frictions and vibrations and noises that may be generated between the gears and the pinions, and thus for increasing the working life of the gears and the pinions of the planetary gear device.

In accordance with one aspect of the invention, there is provided a planetary gear device comprising a housing including a chamber formed therein for receiving lubricating member therein, and including an internal gear provided therein, a carrier rotatably received in the chamber of the housing, and including an output shaft extended therefrom, and including a chamber formed therein, and including a number of openings formed therein and communicating with the chamber thereof, a number of planet pinions rotatably received in the openings of the carrier respectively, and each rotatably attached to the carrier with an axle, and the planet pinions being engaged with the internal gear of the housing, and the planet pinions each including a bore formed therein for receiving the axle, and having an inner diameter greater than an outer diameter of the axle, to form a peripheral channel between the planet pinion and the axle, and a number of rollers received within the peripheral channel which is formed between the planet pinion and the axle, and the rollers may be acted as a bearing device for allowing the planet pinions to be smoothly rotated relative to the axles respectively.

The planet pinions each includes at least one side portion having at least one slot formed therein, and communicating with the bore of the planet pinion, for allowing the lubricating member to be filled into the bore of the planet pinion via the recessed slot of the planet pinion.

The planet pinions each includes two side portions each having a cap provided thereon, for enclosing the peripheral channel which is formed between the planet pinion and the axle, and for stably retaining the rollers within the bore of the planet pinion, and for preventing the rollers from being disengaged from the planet pinion and the axle.

For example, the caps may either be attached to the axles respectively, or attached to the side portions of the planet pinions respectively, for enclosing the peripheral channel which is formed between the planet pinion and the axle, and thus for stably retaining the rollers within the bore of the planet pinion, and for preventing the rollers from being disengaged from the planet pinion and the axle.

For example, the planet pinions each includes one or more recessed slots formed in either of the side portions thereof, and communicating with the bore thereof, and extended out of the cap, to form a passage for allowing the lubricating member to be filled into the bore of the planet pinion, in order to suitably lubricate the rollers and the planet pinions and the axles.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
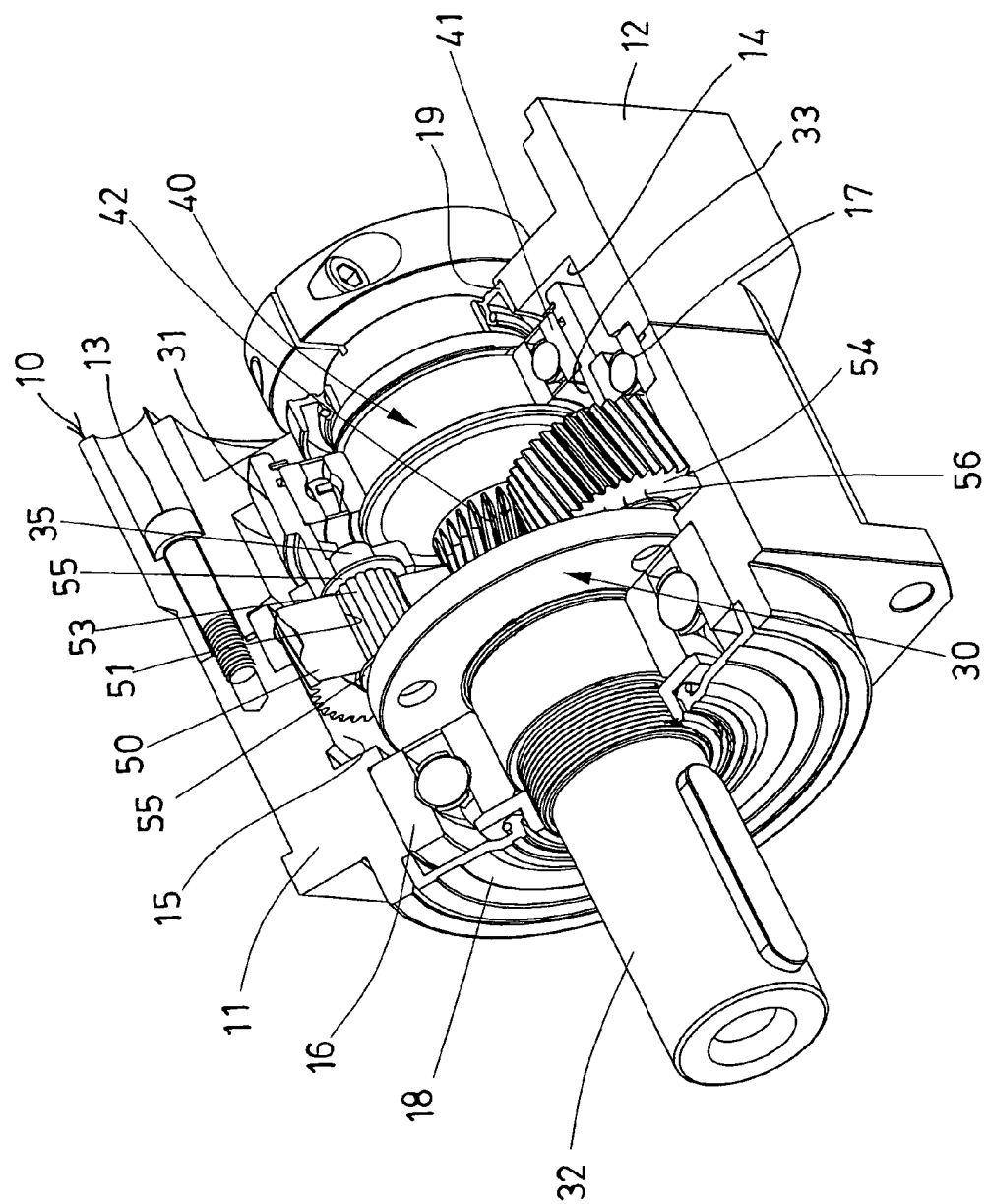
FIG. 1 is a perspective view of a planetary gear device in accordance with the present invention, in which a portion of the planetary gear device has been cut off, for showing or illustrating the inner structure of the planetary gear device.
Figure 2:
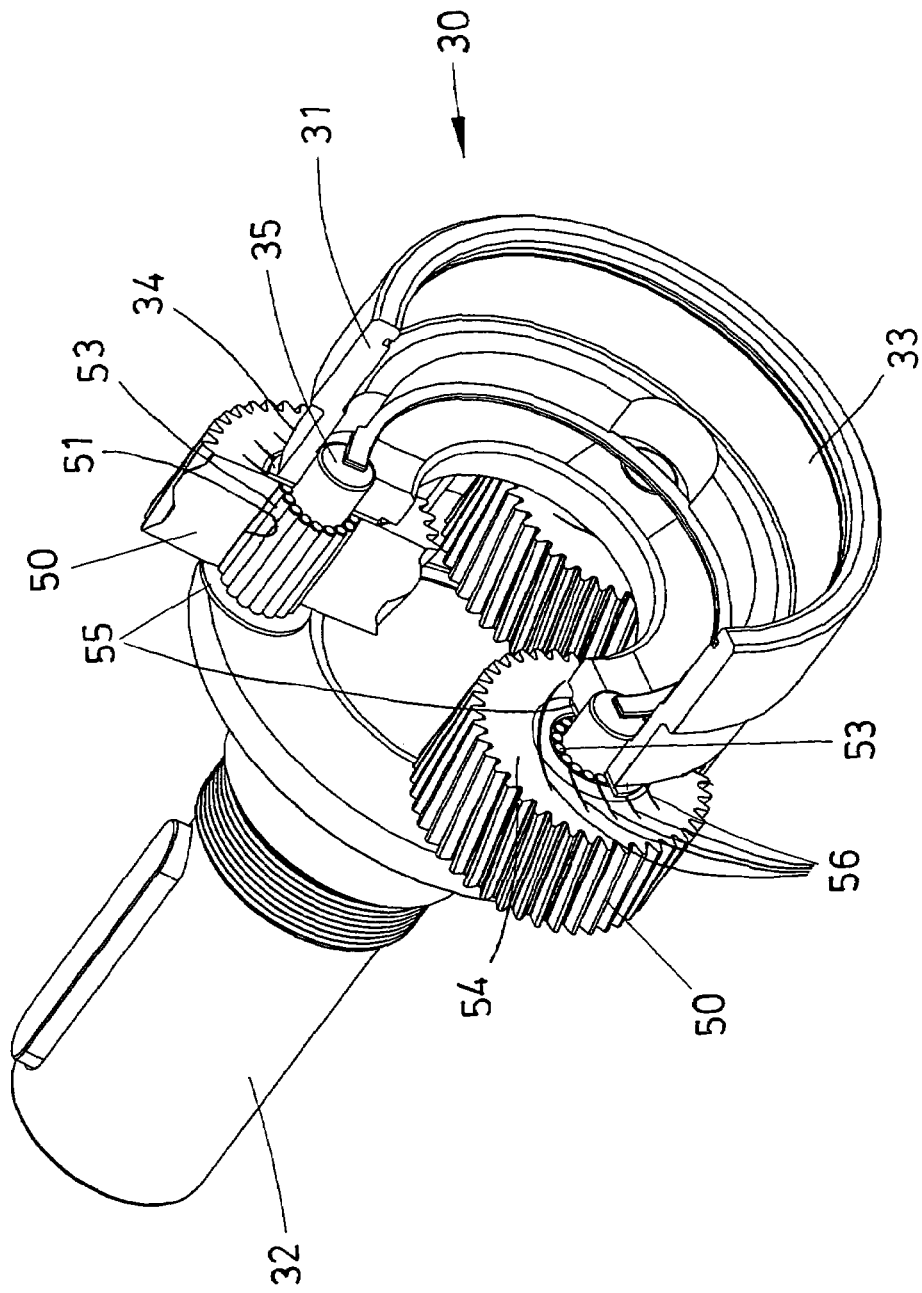
FIG. 2 is a partial perspective view of the planetary gear device, in which the outer housing has been removed, and a portion of the planetary gear device has also been cut off, for showing or illustrating the inner structure of the planetary gear device.
Figure 4:
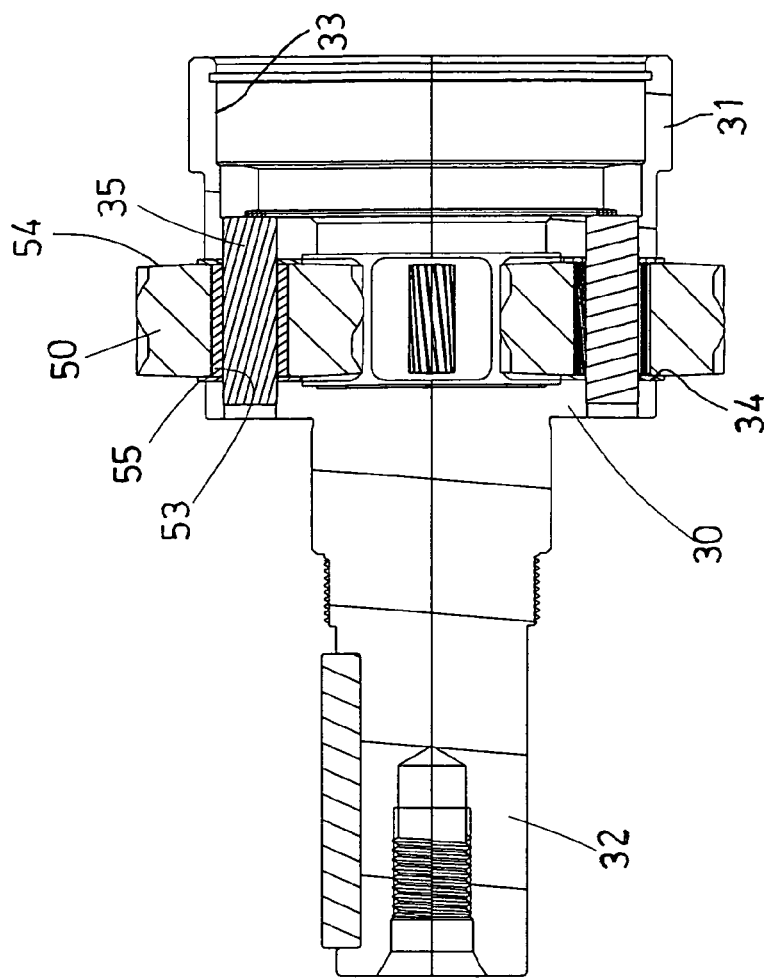
FIG. 4 is a partial cross sectional view of the planetary gear device, taken along lines 4-4 of FIG. 3.
Figure 3:
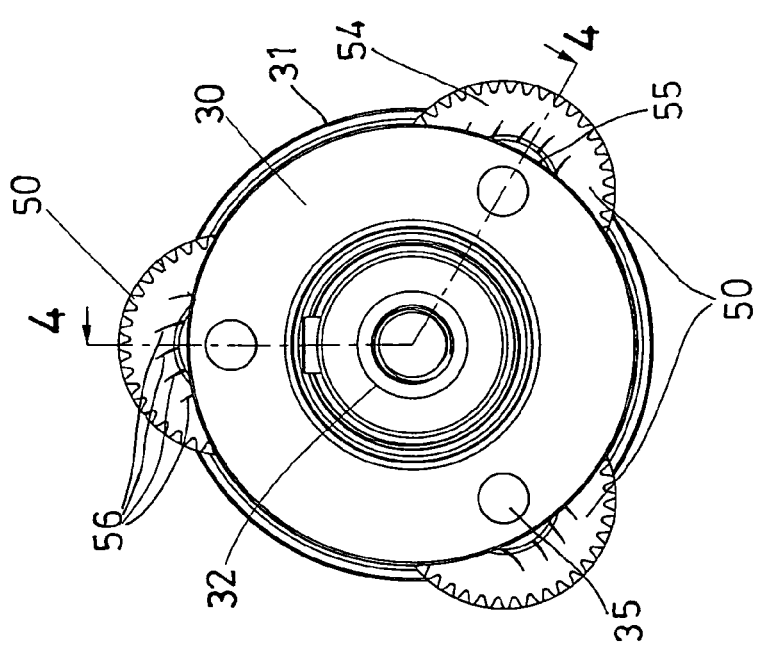
FIG. 3 is an end view of the planetary gear device as shown in FIG. 2.
Figure 5:
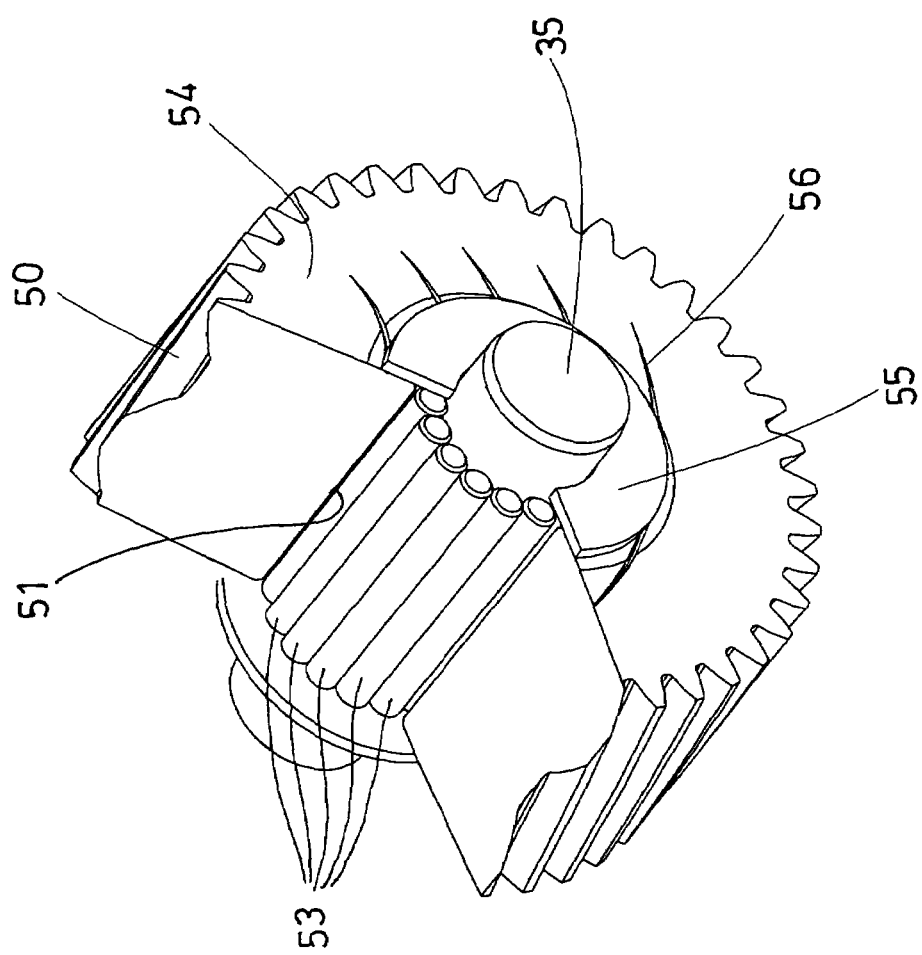
FIG. 5 is an enlarged partial perspective view illustrating one of the planetary pinions of the planetary gear device, in which a portion of the planetary pinion has also been cut off, for showing or illustrating the inner structure of the planetary pinion.

Referring to the drawings, and initially to FIGS. 1-4, a planetary gear device in accordance with the present invention comprises an outer housing 10 which may include two or more housing members 11, 12 coupled or secured together with such as fasteners 13, and which may include a chamber 14 formed therein, for rotatably receiving a follower 30 therein, and which includes an internal gear 15 formed or provided therein.

For example, the follower 30 includes a carrier 31 rotatably received or engaged within the chamber 14 of the housing 10 with one or more bearings 16, 17, and one or more oil seal members 18 attached to the housing 10 and engaged with the bearings 16, for confining or retaining lubricating member or grease or oil that may be provided or filled or fed into the bearings 16, to allow the bearings 16 to be suitably lubricated.

The follower 30 includes an output shaft 32 extended from the carrier 31, and preferably engaged with the bearing 16, and extended out of the housing 10, best shown in FIG. 1, to allow the follower 30 to be smoothly and suitably and rotatably received within the housing 10. The follower 30 also includes a chamber 33 formed in the carrier 31, for rotatably receiving an active member or sun member 40 therein.

For example, the active member or sun member 40 may be rotatably received or engaged within the chamber 33 of the carrier 31 with one or more bearings 41, and one or more oil seal members 19 may be attached to the carrier 31 or to the housing 10 and engaged with the bearings 41, for confining or retaining lubricating member or grease or oil that may be provided or filled or fed into the bearings 41, to allow the bearings 41 to be suitably lubricated.

The follower 30 further includes a number of or three or more spaces or openings 34 formed in the carrier 31 and communicating with the chamber 33 of the carrier 31, each for rotatably receiving a planet member or planet pinion 50 therein, the planet pinions 50 are rotatably attached to the carrier 31 with an axle 35 each, and are engaged with the internal gear 15 of the housing 10, and also engaged with a gear 42 that are attached to or extended from the active member 40.

In operation, the planet pinions 50 and thus the carrier 31 of the follower 30 may be rotated or driven by the gear 42 of the active member 40 when the active member 40 is rotated or driven by a motor (not shown) that is provided and coupled to the active member 40, to allow the output shaft 32 of the follower 30 to be driven to rotate in a reduced rotational speed as compared with that of the gear 42 of the active member 40. The above-described structure is conventional and has been disclosed in the applicant's co-pending U.S. Pat. No. 6,503,168 to Chang, which may be taken as a reference for the present invention.

Figure 7:
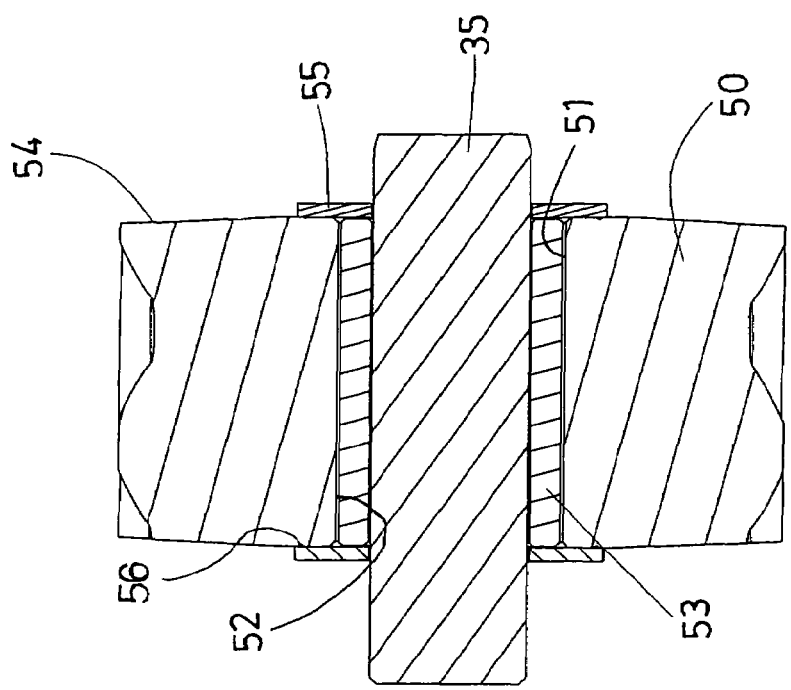
FIG. 7 is a cross sectional view of the planetary pinion, taken along lines 7-7 of FIG. 6.
Figure 6:
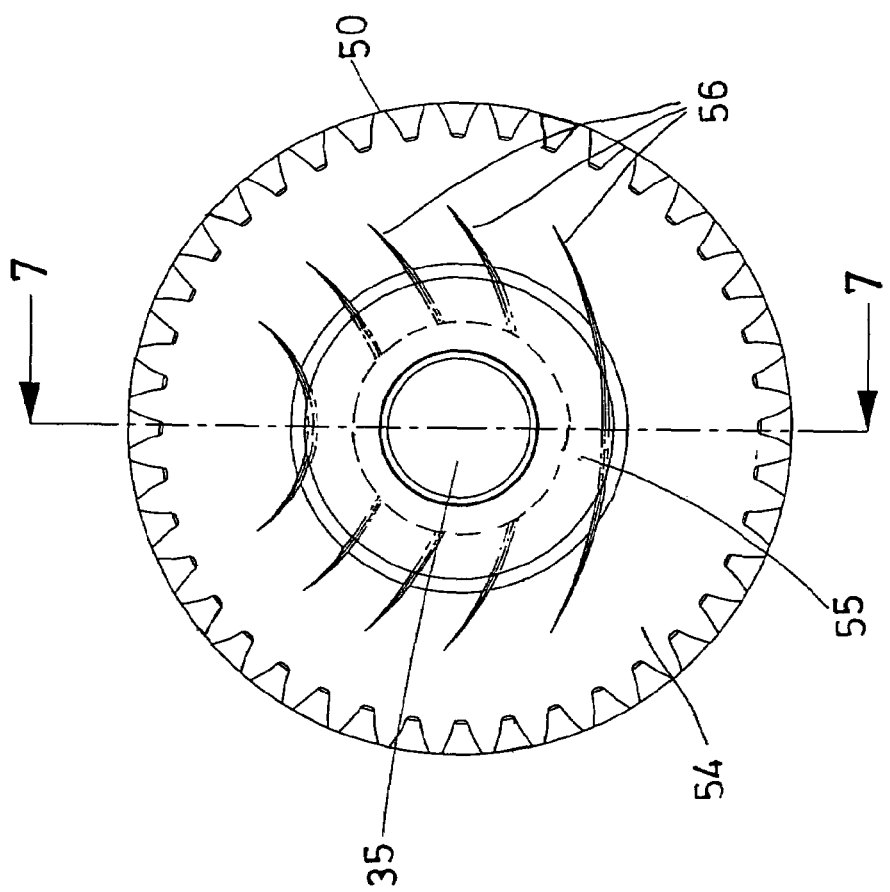
FIG. 6 is an end view of the planetary pinion as shown in FIG. 5.

The planet pinions 50 each includes a bore 51 formed therein for receiving the axle 35, and having an inner diameter greater than the outer diameter of the axle 35, to form a peripheral or annular channel 52 between the planet pinion 50 and the axle 35 (FIG. 7), and for receiving a number of rollers 53 therein (FIGS. 1-2, 4-5 and 7), such that the rollers 53 may be formed and acted as a bearing for allowing the planet pinions 50 to be smoothly rotated relative to the axles 35 respectively.

The planet pinions 50 each further includes two side portions 54 each having a cap 55 attached thereto, or the caps 55 may be attached onto each of the axles 35, and engaged with the two side portions 54 of each of the planet pinions 50, or simply anchored within the openings 34 by the carrier 31 or the follower 30, for enclosing the peripheral or annular channel 52 that is formed between the planet pinion 50 and the axle 35, and for stably retaining the rollers 53 within the bore 51 of the planet pinion 50, and thus for preventing the rollers 53 from being disengaged from the planet pinion 50 and the axle 35.

The planet pinions 50 each further includes one or both side portions 54 each having one or more recessed grooves or scratches or passages or slots 56 formed therein, best shown in FIGS. 2-3, and 5-7, and communicating with the bore 51 of the planet pinion 50, and partially extended out of the cap 55, and thus formed as passages for allowing the lubricating member or grease or oil to flow or to be filled or supplied into the bore 51 of the planet pinion 50, for suitably lubricating the rollers 53 and the planet pinions 50 and the axle 35.

In operation, the lubricating member or grease or oil may be filled or supplied into and retained within the chamber 14 of the housing 10 with the oil seal members 18, and may be filled or supplied into and retained within the chamber 33 of the carrier 31, and may be filled or supplied into and retained within the bore 51 of the planet pinion 50 via the slots 56 that are formed in either or both side portions 54 of each of the planet pinions 50, for allowing the rollers 53 and the planet pinions 50 and the axle 35 to be suitably lubricated.

The conventional or typical planetary gear devices or reduction gearings fail to provide a number of rollers 53 disposed or received within a peripheral or annular channel 52 that is formed or provided between the planet pinion 50 and the axle 35, in order to form or to act as a bearing device for allowing the planet pinions 50 to be smoothly rotated relative to the axles 35 respectively, and also fail to provide one or more recessed grooves or scratches or passages or slots 56 in either or both side portions 54 of each of the planet pinions 50, for allowing the lubricating grease or oil to flow or to be filled or supplied into the bore 51 of the planet pinion 50, in order to suitably lubricate the rollers 53 and the planet pinions 50 and the axle 35.

Accordingly, the planetary gear device in accordance with the present invention includes an oil supplying or filling structure for suitably feeding or supplying or filling lubricating oil to lubricate the gears and the pinions of the planetary gear device, and for decreasing frictions and vibrations and noises that may be generated between the gears and the pinions, and thus for increasing the working life of the gears and the pinions of the planetary gear device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A planetary gear device comprising:

a housing including a chamber formed therein for receiving lubricating member therein, and including an internal gear provided therein, a carrier rotatably received in said chamber of said housing, and including an output shaft extended therefrom, and including a chamber formed therein, and including a plurality of openings formed therein and communicating with said chamber thereof, a plurality of planet pinions rotatably received in said openings of said carrier respectively, and each rotatably attached to said carrier with an axle, and said planet pinions being engaged with said internal gear of said housing, and said planet pinions each including a bore formed therein for receiving said axle, and having an inner diameter greater than an outer diameter of said axle, to form a peripheral channel between said planet pinion and said axle, and said planet pinions each including at least one side portion having at least one slot formed therein, and communicating with said bore of said planet pinion, for allowing the lubricating member to be filled into said bore of said planet pinion, and a plurality of rollers received within said peripheral channel which is formed between said planet pinion and said axle, and acted as a bearing device for allowing said planet pinions to be smoothly rotated relative to said axles respectively.

2. The planetary gear device as claimed in claim 1, wherein said planet pinions each includes two side portions each having a cap provided thereon, for enclosing said peripheral channel which is formed between said planet pinion and said axle, and for stably retaining said rollers within said bore of said planet pinion, and for preventing said rollers from being disengaged from said planet pinion and said axle.

3. A planetary gear device comprising:

a housing including a chamber formed therein for receiving lubricating member therein, and including an internal gear provided therein, a carrier rotatably received in said chamber of said housing, and including an output shaft extended therefrom, and including a chamber formed therein, and including a plurality of openings formed therein and communicating with said chamber thereof, a plurality of planet pinions rotatably received in said openings of said carrier respectively, and each rotatably attached to said carrier with an axle, and said planet pinions being engaged with said internal gear of said housing, and said planet pinions each including a bore formed therein for receiving said axle, and having an inner diameter greater than an outer diameter of said axle, to form a peripheral channel between said planet pinion and said axle, a plurality of rollers received within said peripheral channel which is formed between said planet pinion and said axle, and acted as a bearing device for allowing said planet pinions to be smoothly rotated relative to said axles respectively, and said planet pinions each including two side portions each having a cap provided thereon for enclosing said peripheral channel which is formed between said planet pinion and said axle and for stably retaining said rollers within said bore of said planet pinion and for preventing said rollers from being disengaged from said planet pinion and said axle, and said planet pinions each including at least one slot formed in either of said side portions thereof, and communicating with said bore thereof, and extended out of said cap, to form a passage for allowing the lubricating member to be filled into said bore of said planet pinion.

4. The planetary gear device as claimed in claim 2, wherein said caps are attached to said axles respectively.

5. The planetary gear device as claimed in claim 2, wherein said caps are attached to said side portions of said planet pinions respectively.

* * * * *